(12) United States Patent
Bruck et al.

(10) Patent No.: US 6,428,593 B1
(45) Date of Patent: Aug. 6, 2002

(54) FILTER HOLDER GASKET ASSEMBLY FOR ENHANCED SECUREMENT OF CANDLE FILTERS

(75) Inventors: Gerald J. Bruck, Murrysville; Mary Anne Alvin, Pittsburgh, both of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 1 day.

(21) Appl. No.: 09/676,342

(22) Filed: Sep. 29, 2000

(51) Int. Cl.[7] .......................... B01D 35/14; B01D 35/30
(52) U.S. Cl. .............................. 55/482; 55/505; 55/502; 55/508; 55/523
(58) Field of Search ........................ 55/523, 508, 502, 55/341.1, 505, 482

(56) References Cited

U.S. PATENT DOCUMENTS

| | | | |
|---|---|---|---|
| 5,185,019 A | * | 2/1993 | Haldipur et al. ............... 55/378 |
| 5,433,771 A | | 7/1995 | Bachovchin et al. |
| 5,474,586 A | * | 12/1995 | Eaton et al. ............... 55/341.1 |
| 5,876,471 A | | 3/1999 | Lippert et al. |
| 5,944,859 A | | 8/1999 | Lippert et al. |

* cited by examiner

Primary Examiner—Robert A. Hopkins

(57) ABSTRACT

A filter assembly for holding a candle filter element within a hot gas cleanup system pressure vessel is disclosed. The filter assembly includes at least one bottom ring gasket positioned in an annular groove formed in a portion of a metal bottom clamp for the assembly. The annular groove is located at a junction between an extended bottom portion of the filter holder and the metal bottom clamp. In another aspect of the filter assembly, an inner surface of the filter holder designed to receive a fail-safe regenerator having at least one locking groove formed thereon is disclosed. The locking groove has at least two portions formed in communication with the interior of the filter holder. The locking groove can include a first axial groove portion and a second circumferential groove portion in communication with each other. Each portion of the locking groove is structured to receive therein a tooth formed integrally with or connected to a fail-safe regenerator device.

18 Claims, 4 Drawing Sheets

FILTER HOLDER GASKET ASSEMBLY FOR ENHANCED SECUREMENT OF CANDLE FILTERS

CROSS-REFERENCE TO RELATED APPLICATION

The present application relates to U.S. patent application Ser. No. 09/676,341, filed on Sep. 29, 2000, having Attorney Docket number 00P7967US, and entitled "FILTER HOLDER ASSEMBLY HAVING EXTENDED COLLAR SPACER RING" to Alvin et al, filed concurrently herewith.

FIELD OF THE INVENTION

The present invention relates generally to hot-gas cleanup systems and more particularly to filter holder and gasket assemblies that provide particulate barrier seals between the body of a candle filter element and the filter holder when coupled to a hot gas cleanup system support plate.

BACKGROUND OF THE INVENTION

Modern industrial methods have resulted in a need for an apparatus that is capable of efficiently filtering high temperature combustion gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. Examples of such filtering apparatus and systems can be found in U.S. Pat. Nos. 5,433,771 and 5,876,471, both of which are incorporated in their entirety herein by reference.

It is therefore desirable to provide a filtering apparatus that can filter high temperature, high pressure, aggressive gases, such as oxidizing gases, and/or reducing gases. It is also desirable to provide an improved filter holder and gasket assembly that can be employed with a conventional candle filter that can be more securely and more conveniently mounted within a pressure vessel as compared to previous filter holder and gasket assemblies.

Referring to Prior Art FIG. 1, conventional fixturing of hot gas particle filters using ceramic candle filter elements typically involves the use of two gaskets. One gasket 14 is commonly made donut-shaped with a ceramic cloth outer wrap and filled with a ceramic fiber mat. This gasket 14 is positioned directly above the top flange of the ceramic filter 11 and directly below the spacer ring 10 of a fail-safe regenerator device 8. The fail-safe regenerator device 8 functions to filter particulates from the combustion or gasification system during a filter failure event. It also functions as a heat exchanger during back pulsing to warm back pulse gas en route to the filter, thereby reducing thermal shock. A second gasket 16 is commonly made ring-shaped out of ceramic blanket material. This second gasket 16 is positioned directly below a counter-bored land inside of the filter element holder 1 and directly above the flange of the spacer ring 10. Both of these gaskets 14,16 must resist leakage. If gasket 14 leaks, particulates can bypass the filter element 11 to the clean side of the filter, thereby causing clogging of the fail-safe regenerator device 8 and loss of filter element effectiveness. Also, to the extent that the fail-safe is not an effective barrier to particulates, leakage can cause undesired particulate loading to the downstream gas turbine and undesired stack emissions. If gasket 16 leaks, particulates can bypass both the filter element 11 and the fail-safe regenerator device 8. The sock 12 and the lower donut 15 do not act as gaskets or seals but provide a cushion between metal and ceramic materials.

In addition, current fixturing of fail-safe regenerators involves wrapping a ceramic cloth material (wrap) around the body of the fail-safe regenerator and securing it in position with tape so that the fail-safe regenerator can be inserted by a friction fit into the bore of the filter holder. The wrap provides sufficient friction against the bore of the filter holder to overcome the weight of the fail-safe regenerator and to hold the component in place while the installer then inserts the candle filter, associated gasketing and other filter components. The fail-safe regenerator is held in place during operation only by the modest frictional forces described above coupled with the mechanical compression of the gaskets positioned above and below the top flange of the candle filter.

To the extent that gaskets in the filter assembly lose resilience during high temperature exposure in a filtering operation, the effectiveness of the friction fit can be reduced. Also, during reverse flow back pulse cleaning, a downward force is exerted on the candle filter and the lower gasket which can permit undesirable downward motion of the fail-safe regenerator. During pulsing, compression is also momentarily reduced in the top gasket that is located between the counter-bore of the filter holder and the bottom flange of the fail-safe regenerator. Frequent disintegration of this gasket (and of the wrap around the fail-safe regenerator body) is often attributed to insecure fixturing of the fail-safe regenerator and the candle filter.

What is needed therefore is an improved gasket design that provides an additional gasket to provide a more effective barrier to particulates during filtering operation. What is also needed is an improved structure for securing the fail-safe regenerator within the filter holder assembly. Rather than rely on the friction fit of the wrap and the compression of filter gaskets, the fail-safe regenerator needs to be held more securely in place.

SUMMARY OF THE INVENTION

The filter assembly of the present invention is provided for holding a candle filter element within a hot gas cleanup system pressure vessel. The assembly includes a filter holder having a peripheral sidewall that defines an interior chamber therein and an annular spacer ring positioned within the interior chamber. The filter assembly of the present invention includes at least one top donut gasket separate and apart from the filter holder. The top donut gasket is formed to be positioned on the filter flange end top surface for providing a seal between the annular spacer ring and the filter flange top surface. In addition, a metal bottom clamp is positioned around the filter body between the sleeve gasket and the filter holder. The metal bottom clamp can have an angled land surface thereon extending away from the sleeve. Also, at least one cushion separate and apart from the filter holder is positioned between the sleeve gasket and the filter holder sidewall on the land surface to provide a compliant separation between a portion of the filter body and the filter holder sidewall.

The assembly of the present invention further includes at least one bottom ring gasket positioned in an annular groove formed in a portion of the metal bottom clamp. The annular groove is located at a junction between an extended bottom portion of the filter holder and a radially extending portion of the metal bottom clamp.

In another aspect of the present invention, a locking groove is formed in an inner surface of the filter holder. The locking groove can have at least two portions formed in communication with the interior chamber. The locking groove can include a first axial groove portion and a second circumferential groove portion in communication with the first axial groove portion. The locking groove portions are structured to receive a tooth or teeth, such as a tooth or teeth formed integrally with an outer surface of a fail-safe regenerator device.

BRIEF DESCRIPTION OF THE DRAWINGS

Prior Art

Prior Art

DETAILED DESCRIPTION OF THE PREFERRED EMBODIMENT

Figure 1:
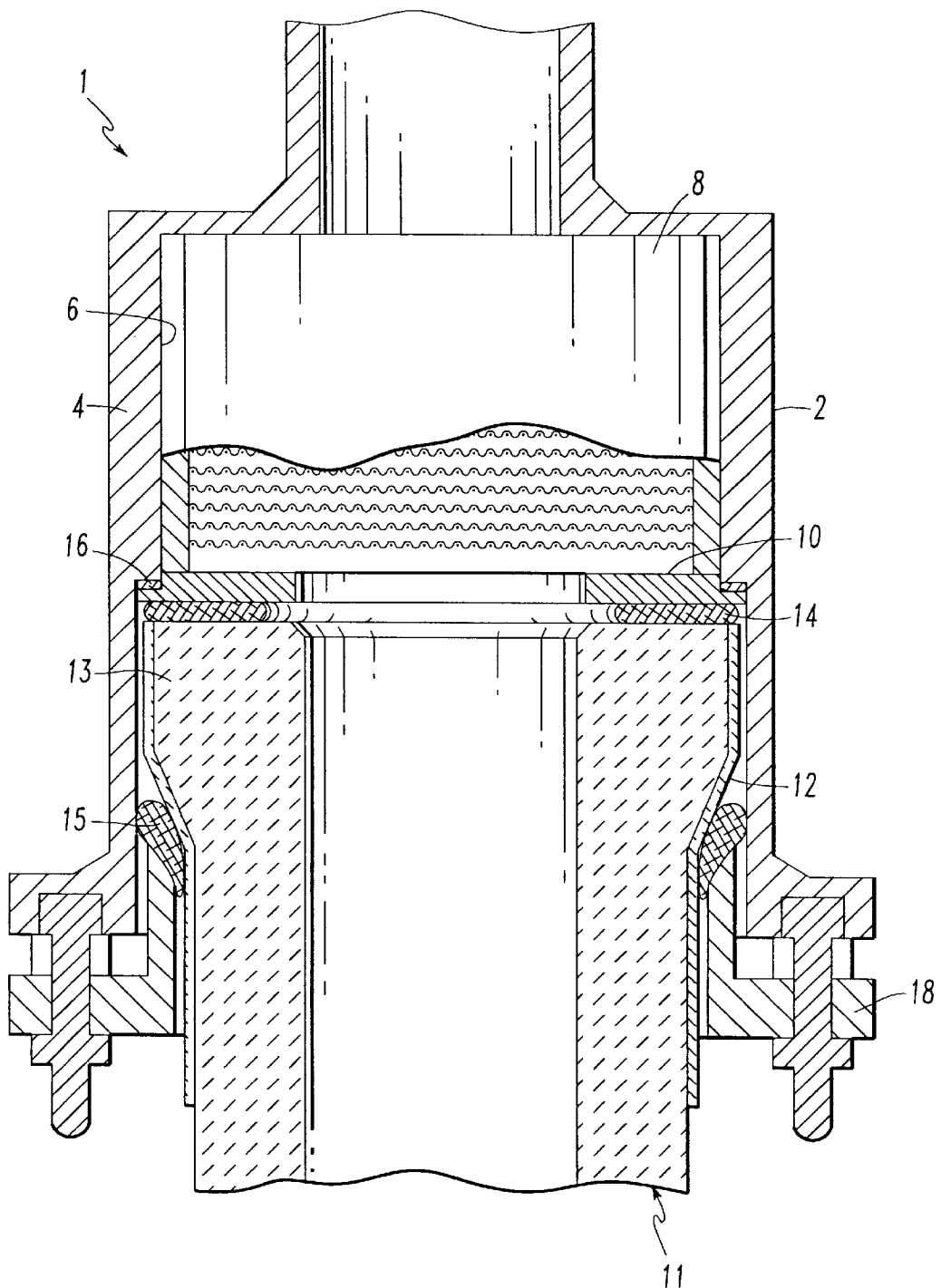
FIG. 1 is a sectional view of a filter holder and gasket assembly employed with a conventional monolithic thick-walled hollow candle filter.
Figure 2:
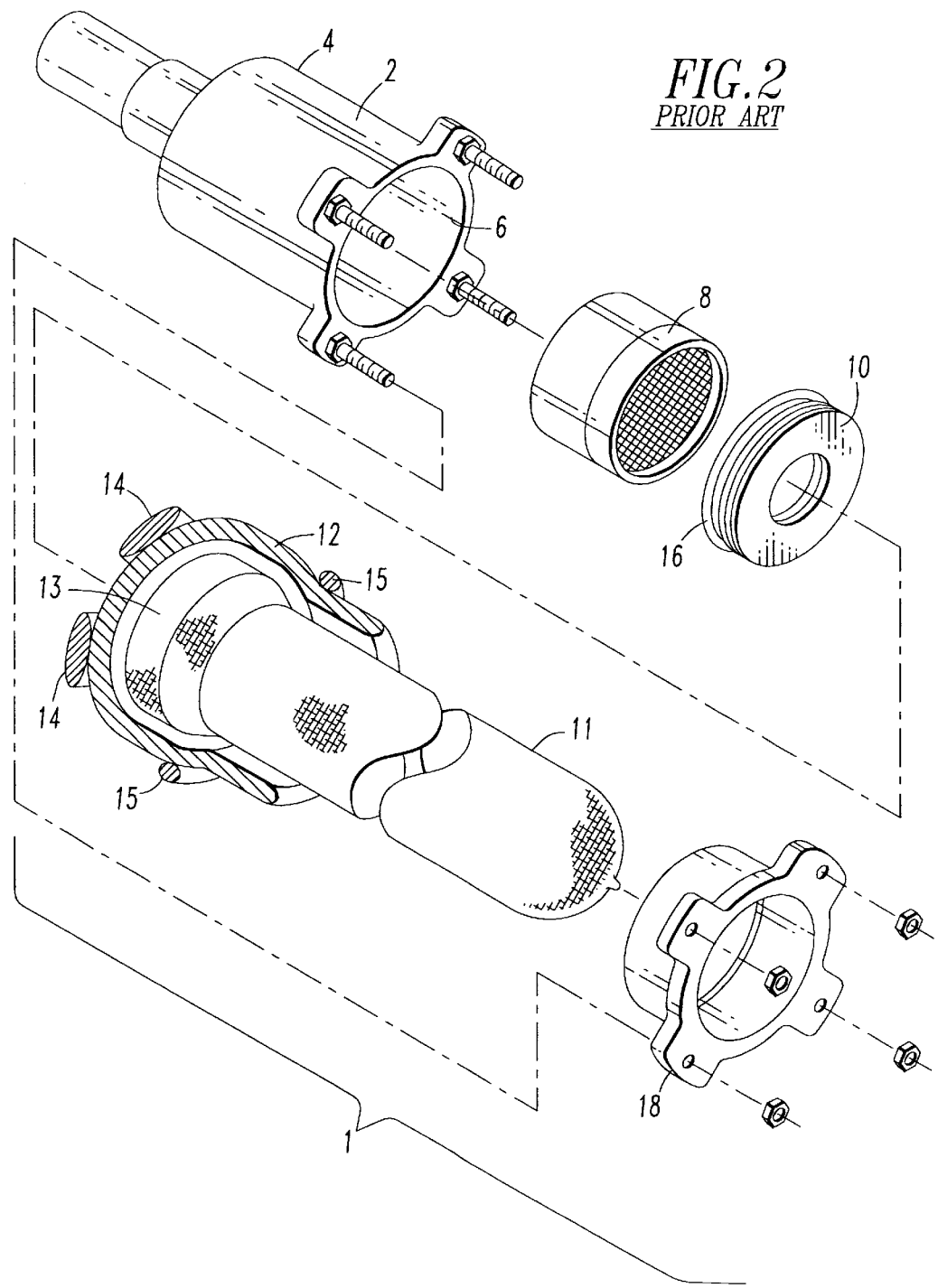
FIG. 2 is an exploded view of the filter holder and gasket assembly shown in FIG. 1.

Referring now to FIGS. 1 and 2, a filter holder and gasket assembly 1 is shown in assembled form. The filter holder and gasket assembly 1 comprises a filter holder 2 having a peripheral sidewall 4 which defines an interior chamber 6, a fail-safe regenerator device 8 positioned within the interior chamber 6, an annular spacer ring 10 mounted, within the interior chamber 6, a sock or sleeve 12, a top compliant gasket 14, a middle compliant cushion 15, and a clamping ring 18. It is noted that the fail-safe regenerator device 8 need not be a part of the assembly. The spacer ring 10 is sealed to a counterbore in the filter holder 2 by way of a ring gasket 16.

Preferably, the spacer ring 10 is permanently mounted to the fail-safe regenerator to produce a single unit that is placed within the interior chamber 6 of the filter holder. In this case, the spacer ring 10 may be welded in abutment with the fail-safe regenerator device 8 to provide a means for positioning the fail-safe regenerator 8 unit in the interior chamber 6 and to resist, along with gasket 14, the filter element 11 from moving and contacting the filter holder 2, thereby preventing possible damage to the filter element 11. When the fail-safe regenerator device 8 is not incorporated with the present invention, then only the spacer ring 10 will be positioned within the filter holder interior chamber 6.

The fail-safe regenerator device 8 is provided to resist particulate matter from traveling into the clean gas area of the pressure vessel if a filter element or gasket fails, is damaged or breaks. Additionally, the fail-safe regenerator 8 will heat the back pulsed gas which is generally cooler than the gas stream coming from the combustor to resist the filter elements 11 from enduring thermal fatigue, thermal shock or cracking.

The filter holder 2, annular spacer ring 10, and fail-safe regenerator device 8 are made of a material that can withstand the relatively high temperatures that are reached in a particular system and possess the strength and durability to support the filtering components, preferably a high temperature metal alloy, such as 310s stainless steel.

The gaskets 14,16 and cushions 12,15 are individual components that are separate and apart from the filter holder 2. The gaskets and cushions 12,14,15,16 are preferably made from high temperature ceramic fibers that are woven or braided into a desired pattern or shape, such as an annular gasket or circular sleeve. The shape and size of each gasket 14,16 and cushion 12,15 must be large enough to be positioned on or around the candle filter 11 or spacer ring 10 to provide an adequate particulate barrier seal to resist gas leakage or to provide adequate cushioning. More particularly, the sleeve or sock 12 is preferably made of a woven or braided oxide fabric. The top gasket 14, ring gasket 16 and cushion 15 are preferably made of a braided or woven oxide based fabric that encases an oxide fiber, intermeshed, compliant mat.

The gasket sock or sleeve 12 is positioned around the outer surface of the filter flange 13 and, along with cushion 15, provides a particulate matter barrier seal between the filter body 8 and the filter fixture 18. However, since cushion 15 does not seal to filter holder 2, it normally only serves a cushioning function. The top compliant gasket 14 is positioned along the top surface of the filter flange to provide a compliant cushion and particulate matter barrier seal between the spacer ring 10 and filter flange top. The middle compliant cushion 15 is positioned at the base of the filter flange 13 over the sleeve 12. The middle compliant cushion 15 provides a compliant cushion and particulate barrier seal between the filter body 8 and filter fixture clamping ring 18. The assembled filter holder and gasket assembly 1 is then coupled to the rest of the combustion assembly (not shown).

Figure 3:
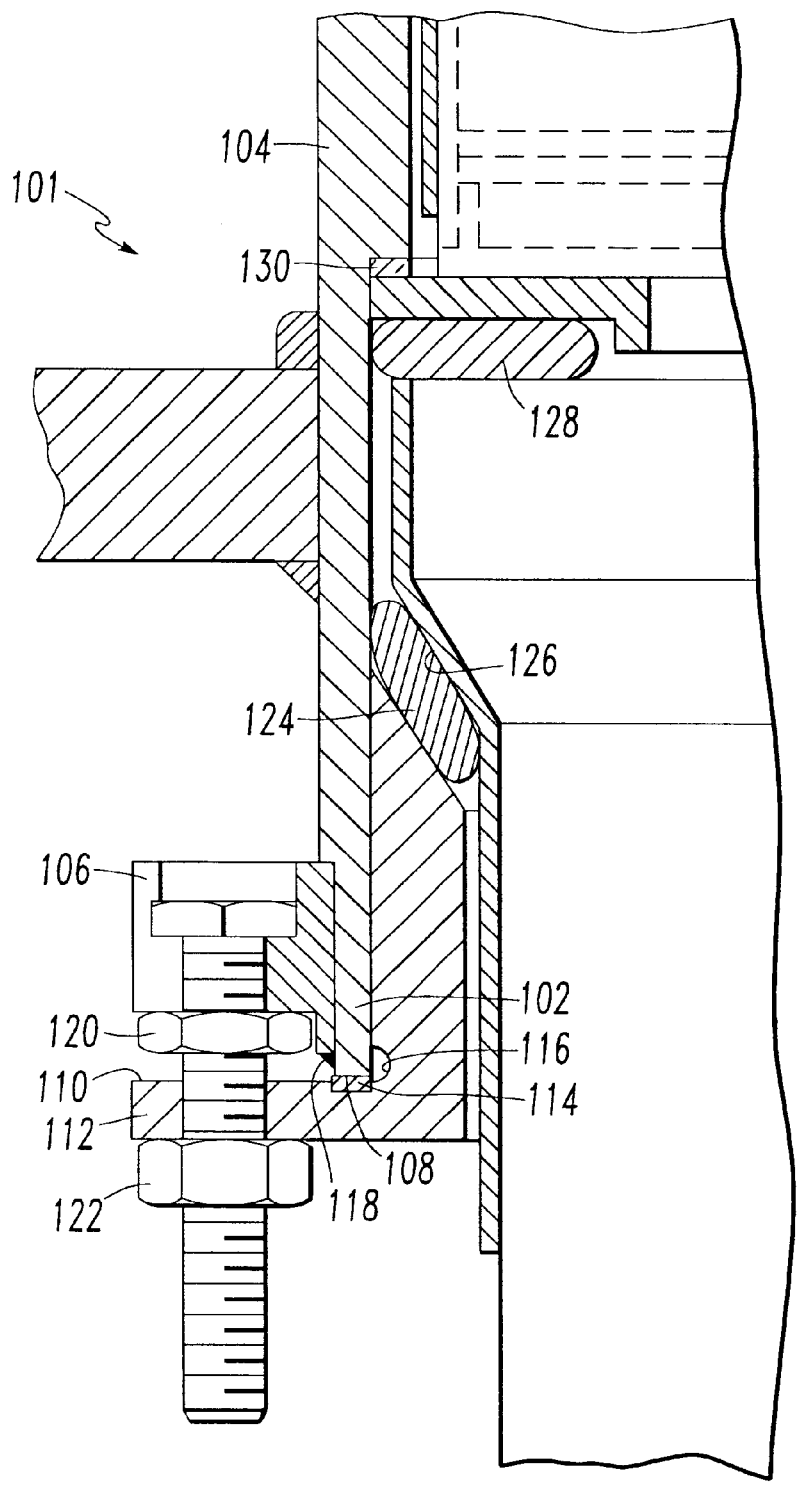
FIG. 3 is a partial, sectional view of a filter holder and gasket assembly employing a gasketing system in accordance with the present invention.

Referring now to FIG. 3, a filter holder gasket assembly 101 in accordance with the present invention is shown. The bottom 102 of the filter holder 104 is structured to be longer than conventional filter holder bottom portions such that the bottom 102 extends below a cast bolting ring 106 of the assembly 101. A shallow-machined annular groove 108 is provided in a top surface 110 of a metal bottom clamp 112 of the assembly 101 to receive therein the extension of bottom 102 of the filter holder 104. The annular groove 108 is formed in a portion of the metal bottom clamp 112 that extends radially away from the filter holder 104. The annular groove 108 serves to accommodate and secure a bottom ring gasket 114.

Inboard of the annular groove 108 an annular pocket 116 can be machined or otherwise suitably formed on the outside diameter of the metal bottom clamp 112. The pocket 116 acts to relieve stress concentration that would otherwise result from a relatively sharp discontinuity at this point on the metal bottom clamp 112. It can be appreciated that a weld 118 which connects the bottom 102 of the filter holder 104 to the cast bolting ring 106 is repositioned in the present invention from being an inboard weld to being an outboard weld 118 as shown. It can be further appreciated by those skilled in the art that the outboard weld 118 that secures the filter holder 104 to the cast bolting ring 106 is comparatively easier to provide than the conventional inboard weld. The outboard weld 118 also resists unfinished edges of the weld 118 from possibly "catching" on gasketing during filter installation. Such "catching" on conventional welds has often caused tearing of gaskets in conventional practice.

To promote uniform compression of the bottom ring gasket 114, the extension of the bottom 102 of the filter holder 104 is sized to perform the spacing function previously performed by spacer nuts. The clamping devices 120 are reduced in thickness such that they do not bottom out during the bolting process, but continue to function to hold the bolts in place during candle filter installation. The extension of the filter holder bottom 102 provides for more uniform spacing than the three or four spacer nuts that have been used previously in conventional practice. This also reduces the possibility of spacer nuts inadvertently unthreading and resulting in oblique spacing and non-uniform gasket compression. Alternatively, it can be appreciated that a C-ring, clip or other suitable mechanical fastening means could be used instead of or in conjunction with the clamping devices to perform the function of holding the bolts in place.

The gasket assembly of the present invention therefore provides a further level of assurance that the gasketing for the filter assembly 101 resists leakage. As shown in FIG. 3, a bottom donut 124 and sleeve gasket 126 now serve the dual functions of cushioning and gasketing, in cooperation with the bottom ring gasket 114. This configuration of the bottom donut 124, sleeve gasket 126 and bottom ring gasket 114 provides a primary barrier to resist particulate leakage. A top donut gasket 128 and top ring gasket 130 serve as a second level or backup barrier to resist particulate leakage.

The annular groove 108 provides a secure pocket for receiving the bottom ring gasket 114. With the bottom 102 of the filter holder 104 extended and serving the additional function of spacing, compression of the bottom ring gasket 114 is substantially uniform. It is believed that the force of compression on the bottom ring gasket 114 is more than the force applied to the top ring gasket 130 which is secured by the indirect compression of the top donut gasket 128, the bottom donut 124 and the sleeve gasket 126.

Figure 4A:
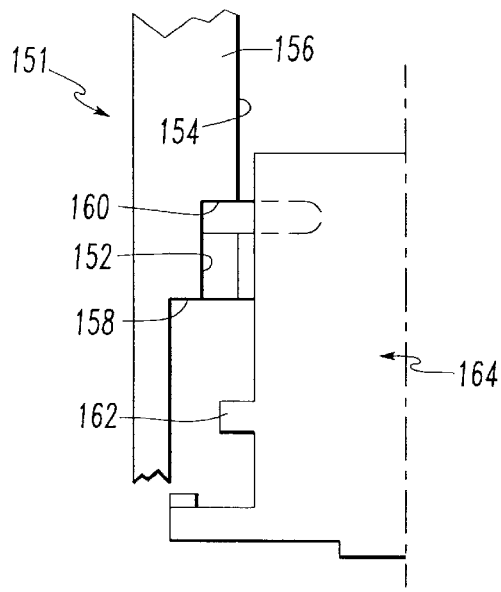
FIG. 4A is a partial, schematic view of a portion of FIG. 3, showing a first position of the latch system of the present invention.
Figure 4B:
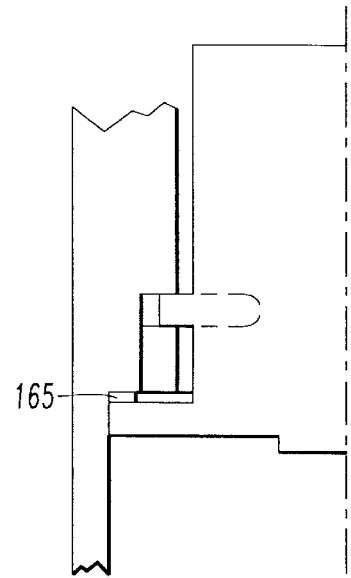
FIG. 4B is a partial, schematic view of a second position of the latch system of FIG. 4A.
Figure 4C:
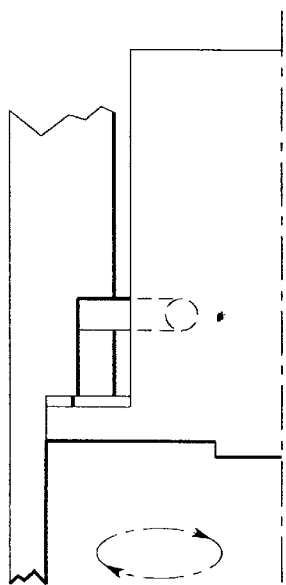
FIG. 4C is a partial, schematic view of a third position of the latch system of FIG. 4A; and, FIG. 5 is a partial, schematic view of a portion of FIG. 3 showing a conical wrap embodiment of the present invention.

Referring now to FIGS. 4A through 4C, in partial views of the filter holder of FIG. 3, in another aspect of the present invention, a mechanical latch system 151 is shown. Preferably at least three grooves such as groove 152 are formed axially along an inside surface 154 of a filter holder wall 156 in the area of filter holder wherein seats a fail-safe regenerator device 164. The axial grooves 152 extend from the edge of a counterbore 158 formed in the filter holder wall 156 for an axial distance. A corresponding circumferential groove such as groove 160 is formed in the filter holder wall 156 axially spaced from the counterbore 158 and is positioned to communicate with its respective axial groove 152 in a substantially perpendicular relationship.

A tooth 162, corresponding to each axial groove 152, and having a height slightly more than the depth of the axial groove 152, is provided on the outside of the fail-safe regenerator 164. The greater height of the tooth 162 is to accommodate compression of a ring gasket 165. The tooth 162 can be formed integrally with the fail-safe regenerator 164 or connected to the fail-safe regenerator by conventional means. The tooth 162 is also appropriately dimensioned to be suitably received within the circumferential groove 160.

Therefore, in a first position of the tooth 162, the tooth is moved axially through the axial groove 152 until the point is achieved where the axial groove 152 communicates with the circumferential groove 160. In a second position of the tooth 162, at the point of communication between grooves 152,160, the fail-safe regenerator can be rotated within the filter holder. During installation, the tooth 162 is received and moves circumferentially through the groove 160, thereby substantially locking the fail-safe regenerator 164 in position within the filter holder.

Installation of the filter assembly therefore involves pushing the fail-safe regenerator 164 first axially into the filter holder with one or more teeth 162 received and sliding along the axial groove 152 or grooves until the teeth 162 are fully axially inserted. Second, installation includes rotating the fail-safe regenerator. 164 such that the teeth 162 rotate through an arc distance in the circumferential groove 160 or grooves. The fail-safe regenerator is thereby mechanically latched and substantially locked in place by metal-to-metal seating in the circumferential grooves 160 of the filter holder.

The mechanical latch system of the present invention described above substantially reduces the need for a conventional wrap positioned around the body of the fail-safe regenerator to hold the fail-safe regenerator in position during filter installation. An alternative function for this wrap is also disclosed by the present invention. A wrap can be used in conjunction with the mechanical latch system.

Figure 5:
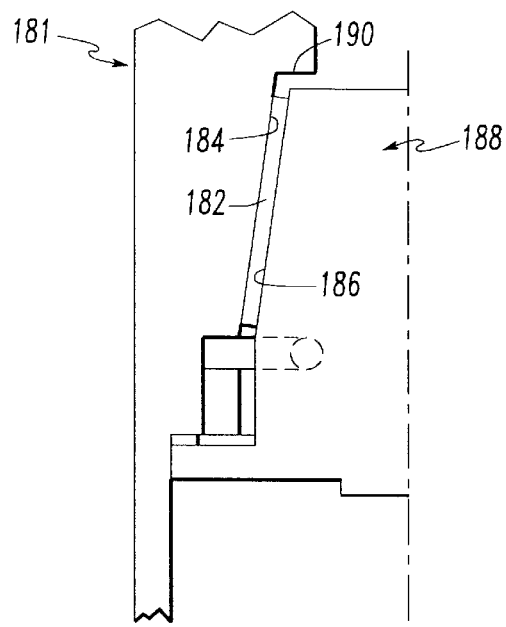

Referring now to FIG. 5, in the form of the invention shown for a filter holder 181, a conical wrap 182 is shown positioned between an inner wall 184 of the filter holder 181 and an outer surface 186 of a fail-safe regenerator device 188. It can be appreciated that, after installation of the filter assembly, axial forces on the fail-safe regenerator 188 cause the wrap 182 to function as a seal and a gasket. The inner wall 184 of the filter holder 181 can be machined to a conical shape. The outer surface 186 of the fail-safe regenerator can likewise be structured into a conical shape complementary to the shape of the inner wall 184. It can be understood that using one or both of a conically shaped inner wall 184 and a fail-safe regenerator device 188 having a conical outer surface in the filter assembly further enhances effectiveness of the gasketing operation.

The wrap 182 can be further woven into a corresponding conical shape such that it fits tightly in the gap between the inner wall 184 of the filter holder 181 and the outer surface 186 of the fail-safe regenerator 188. Compression of the wrap 182 is then effected when the fail-safe regenerator 188 is installed and secured. A ledge 190 can be further provided as shown to resist the wrap 182 from becoming dislodged in filtering or back-pulsing operation.

The present invention may be embodied in other forms without departing from the spirit or essential attributes thereof, and accordingly, reference should be made to the appended claims, rather than to the foregoing specification, as indicating the scope of the invention.

What is claimed is:

1. A filter assembly for holding a candle filter element having a flange within a hot gas cleanup system pressure vessel, comprising:

a. a filter holder having a peripheral sidewall defining an interior chamber therein, said peripheral sidewall having an extended portion;

b. a metal bottom clamp positioned around said filter holder sidewall, said metal bottom clamp having at one end a land surface adjacent to said candle filter element, said metal bottom clamp having a radially extending portion axially spaced along the chamber from said one end so that said radially extending portion extends below the extended portion of said filter holder, said radially extending portion having an annular groove formed therein proximate to said extended portion of said sidewall;

c. at least one individual middle gasket separate and apart from the filter holder, said middle gasket being structured to be positioned between said metal bottom clamp and said candle filter element on said land surface;

d. at least one bottom ring gasket positioned in said annular groove formed in said metal bottom clamp; and, e. means for clamping said metal bottom clamp to said filter holder to compress said bottom ring gasket against said extended sidewall portion end in said annular groove.

2. The assembly of claim 1, further including a spacer ring positioned within said interior chamber, and at least one top donut gasket separate and apart from said filter holder, said top donut gasket being structured to be positioned on a top surface of said flange of said candle filter element to provide a seal between said spacer ring and said flange top surface.

3. The assembly of claim 2, further comprising a fail-safe regenerator device that is removably mounted above said spacer ring within said interior chamber.

4. The assembly of claim 3, wherein said fail-safe regenerator device and said spacer ring are securely mounted together to form a single unit positioned within said interior chamber.

5. The assembly of claim 1, further including at least one sleeve gasket separate and apart from said filter holder, said sleeve gasket being structured to be positioned completely around an outer diameter surface of said candle filter element.

6. The assembly of claim 5, further including said middle gasket being structured to be positioned on said land surface of said metal bottom clamp between said sleeve gasket and said filter holder sidewall to provide a seal between said candle filter flange and said metal bottom clamp.

7. The assembly of claim 1, further comprising a fail-safe regenerator device positioned within said interior chamber downstream of the position where said candle filter element is designed to seat.

8. The assembly of claim 1, further comprising an outboard weld formed at the junction between an outer surface of said sidewall of said filter holder at a location generally adjacent to said bottom gasket to secure said filter holder to said clamping means.

9. The assembly of claim 1, further including an annular pocket formed in an outer surface of said metal bottom clamp proximate said radially extending portion to reduce stress concentration in said filter assembly at a location where a portion of said metal bottom clamp extends radially outwardly from said land surface of said metal bottom clamp.

10. The assembly of claim 1, further including an inner surface of said sidewall having at least one locking groove formed therein having at least two portions formed in communication with said interior chamber, said locking groove including a first axial groove portion and a second circumferential groove portion in communication with said first axial groove portion, said portions of said locking groove being structured to receive a tooth on at least one component positioned within said chamber.

11. The assembly of claim 10, further comprising a fail-safe regenerator device positioned within said interior chamber, wherein said fail-safe regenerator device is removably mounted by at least one tooth extending from an outer surface of said fail-safe regenerator device, said tooth being received into, in a first position of said fail-safe regenerator device, said axial groove portion of said locking groove, and said tooth being received into, in a second position of said fail-safe regenerator device, said circumferential groove portion of said locking groove.

12. The assembly of claim 10, further including a wrap positioned between said fail-safe regenerator device and said inner surface of said interior chamber to further secure said fail-safe regenerator in said assembly.

13. The assembly of claim 12, further including said inner surface having a conical shape complementary to a conical shape of an outer surface of said fail-safe regenerator device.

14. A filter holder assembly for holding a candle filter element within a hot gas cleanup system pressure vessel, comprising:

a. a filter holder having a peripheral sidewall, said sidewall defining an interior chamber having an inner surface; and, b. said inner surface having at least one locking groove formed therein having at least two portions formed in communication with said interior chamber, said locking groove including a first axial groove portion and a second circumferential groove portion in communication with said first axial groove portion, said portions of said locking groove being structured to receive a tooth on at least one component positioned within said chamber.

15. The assembly of claim 14, further including a fail-safe regenerator device positioned within said interior chamber, wherein said fail-safe regenerator device is removably mounted by at least one tooth extending from an outer surface of said fail-safe regenerator device, said tooth being received into, in a first position of said fail-safe regenerator device, said axial groove portion of said locking groove, and said tooth being received into, in a second position of said fail-safe regenerator device, said circumferential groove portion of said locking groove.

16. The assembly of claim 14, further including a wrap positioned between said fail-safe regenerator device and said inner surface of said interior chamber to further secure said fail-safe regenerator in said assembly.

17. The assembly of claim 14, further including said inner surface of said filter holder having a conical shape.

18. The assembly of claim 17, further including an outer surface of said fail-safe regenerator device having a conical shape substantially complementary to said conical shape of said inner surface of said filter holder.

* * * * *